United States Patent
Hobaugh, II

(10) Patent No.: US 6,964,613 B2
(45) Date of Patent: Nov. 15, 2005

(54) UNIVERSAL JOINT

(75) Inventor: James M. Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/279,661

(22) Filed: Oct. 24, 2002

(65) Prior Publication Data

US 2004/0082393 A1 Apr. 29, 2004

(51) Int. Cl.$^7$ ................................. F16D 3/40
(52) U.S. Cl. ........................ 464/131; 464/133
(58) Field of Search .................. 464/131, 133, 464/173; 277/572, 585, 549, 500

(56) References Cited

U.S. PATENT DOCUMENTS

| | | | |
|---|---|---|---|
| 2,374,887 A | * | 5/1945 | Ohl .......................... 277/549 |
| 2,773,366 A | * | 12/1956 | Slaght ....................... 464/131 |
| 2,773,368 A | | 12/1956 | Slaght |
| 2,819,918 A | * | 1/1958 | Seaquist |
| 3,218,051 A | * | 11/1965 | Doetsch ................. 277/500 X |
| 3,369,378 A | | 2/1968 | Miller, Jr. |
| 3,377,820 A | * | 4/1968 | Smith, Jr. ................... 464/131 |
| 3,457,732 A | | 7/1969 | Decouzon |
| 3,581,524 A | | 6/1971 | Pitner et al. |
| 3,901,049 A | | 8/1975 | Herscovici |
| 4,021,085 A | | 5/1977 | Willyard |
| 4,345,768 A | * | 8/1982 | Roussin ..................... 277/500 |
| 4,377,312 A | | 3/1983 | Zackrisson |
| 4,478,591 A | | 10/1984 | Mangiavacchi |
| 4,515,574 A | | 5/1985 | Mazziotti |
| 4,611,932 A | * | 9/1986 | Olschewski et al. ..... 464/131 X |
| 4,650,440 A | | 3/1987 | Fisher |
| 4,710,150 A | | 12/1987 | Mangiavacchi |
| 5,588,915 A | | 12/1996 | Smith |
| 5,716,277 A | | 2/1998 | Reynolds |
| 6,050,899 A | | 4/2000 | Jones et al. |
| 2002/0082092 A1 | | 6/2002 | Beitzel et al. |

FOREIGN PATENT DOCUMENTS

| | | |
|---|---|---|
| AT | 207181 | 1/1960 |
| EP | 1138968 | 10/2001 |
| FR | 1403359 | 7/1964 |

* cited by examiner

*Primary Examiner*—Greg Binda
(74) *Attorney, Agent, or Firm*—Tarolli, Sundheim, Covell & Tummino L.L.P.

(57) ABSTRACT

A universal joint (10) includes a cross member (24) having a trunnion (26) with a radially outer surface (32). A cup (20) is connectable with the trunnion (26) and a yoke (18). The cup (20) has an open end (54) with a radially outer surface (58). A bearing (30) supports the cup (20) for rotation relative to the trunnion (26). A seal (48) engages the trunnion (26) and the cup (20). The seal (48) has a first axial end portion (50) engaging the radially outer surface (32) of the trunnion (26) and a second axial end portion (52) engaging the radially outer surface (58) of the cup (20). The first axial end portion (50) is stretched over the radially outer surface (32) of the trunnion (26) and the second axial end portion (52) is stretched over the radially outer surface (58) of the cup (20).

4 Claims, 1 Drawing Sheet

UNIVERSAL JOINT

FIELD OF THE INVENTION

The present invention relates to a universal joint, and more specifically, to a seal for a universal joint.

BACKGROUND OF THE INVENTION

Universal joints include a cross member with four trunnions extending at right angles relative to one another. A cylindrical bearing cup is disposed over each of the trunnions. Roller bearings provided between each of the bearing cups and trunnions support the bearing cups for rotation relative to the trunnions. The open ends of the bearing cups are provided with elastomeric seals. The elastomeric seal is typically positioned between the trunnion and the bearing cup.

SUMMARY OF THE INVENTION

A universal joint of the present invention includes a cross member having a trunnion with a radially outer surface. A cup is connectable with the trunnion and a yoke. The cup has an open end with a radially outer surface. A bearing supports the cup for rotation relative to the trunnion. A seal engages the trunnion and the cup. The seal has a first axial end portion engaging the radially outer surface of the trunnion and a second axial end portion engaging the radially outer surface of the cup. The first axial end portion is-stretched over the radially outer surface of the trunnion and the second axial end portion is stretched over the radially outer surface of the cup.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
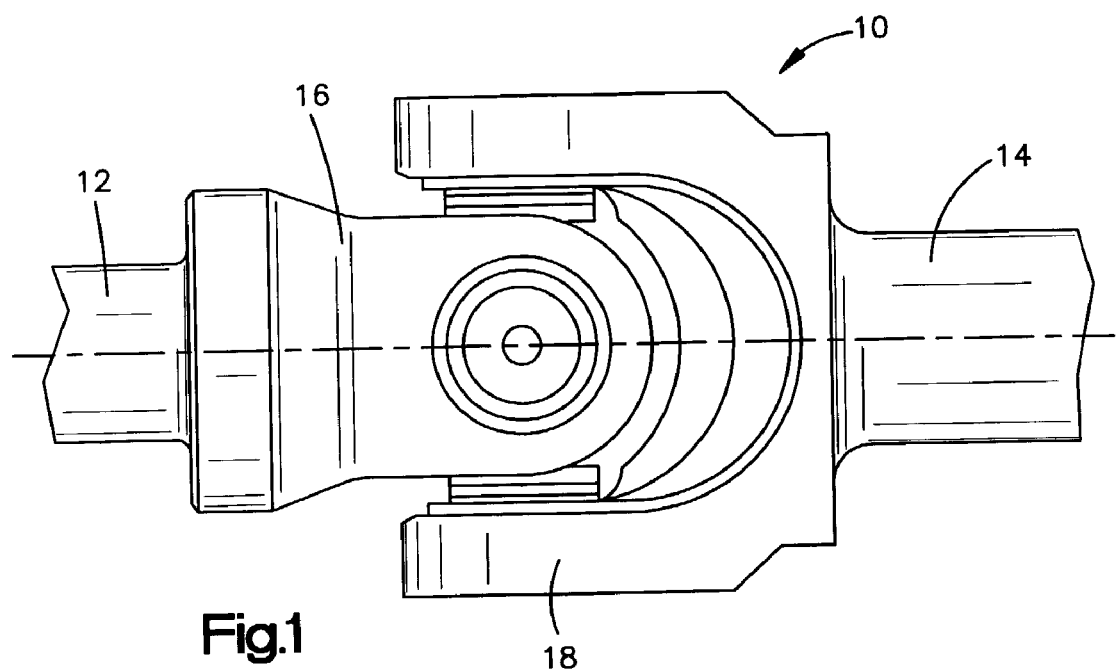
FIG. 1 is a schematic view of a universal joint.
Figure 2:
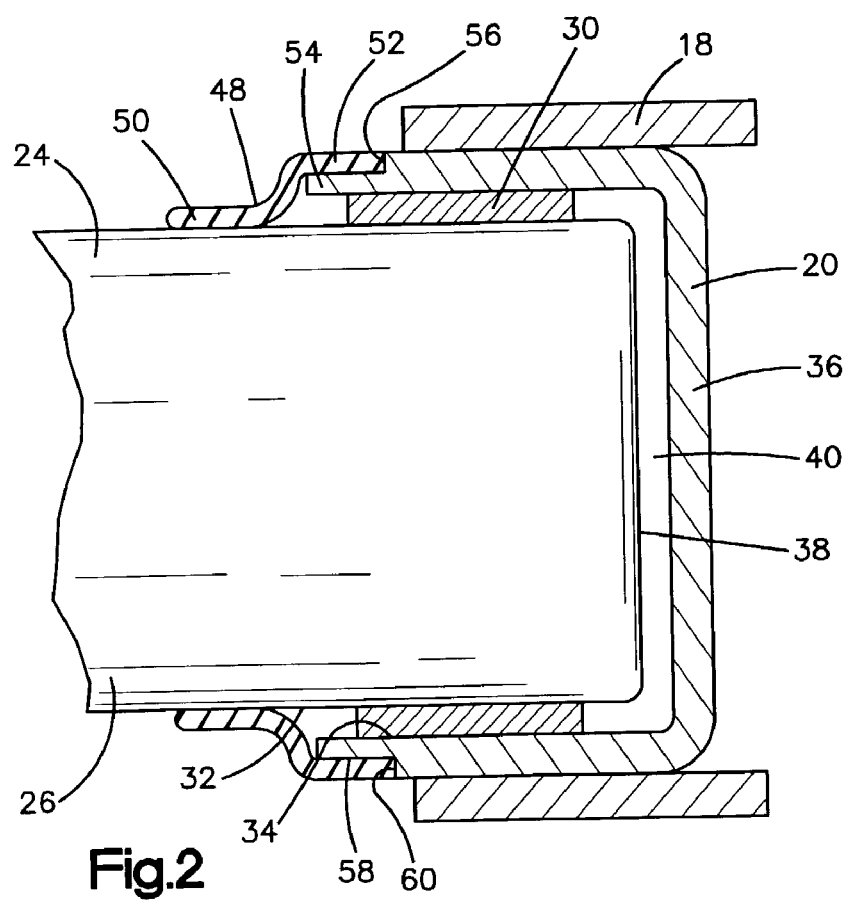
FIG. 2 is a cross sectional view of a trunnion of the universal joint.

A universal joint 10 is illustrated in FIGS. 1 and 2. The universal joint 10 connects a first shaft 12 to a second shaft 14. A yoke 16 is connected to the first shaft 12 and a yoke 18 is connected to the second shaft 14. The yokes 16 and 18 (FIG. 2) are connected with bearing cups 20 rotatable relative to a cross member 24. The yokes 16 and 18 are connected to the bearing cups 20 in any suitable manner, such as by a press fit.

The cross member 24 of the universal joint 10 includes a body and four trunnions 26, one of which is shown in FIG. 2. The trunnions 26 are identical and extend from the body perpendicularly to each other. A bearing 30 supports the bearing cup 20 and the yoke 18 for rotation relative to the trunnion 26. The bearing 30 engages a radially outer surface 32 of the trunnion 26 and a radially inner surface 34 of the bearing cup 20. A closed end wall 36 of the bearing cup 20 and an axial end surface 38 of the trunnion 26 define a space 40. The space 40 is filled with a lubricant, such as grease.

An elastomeric seal 48 retains the grease in the space 40 and prevents contaminants from entering the space and the bearing 30. The elastomeric seal 48 has a first axial end portion 50 that engages the radially outer surface 32 of the trunnion 26. A second axial end portion 52 of the seal 48 engages the bearing cup 20.

The bearing cup 20 has an open end 54 with a recess 56. The recess 56 is defined by a radially outer surface 58 and a radially extending surface 60 extending perpendicular to the outer surface 58. The recess 56 receives the axial end portion 52 of the seal 48. Accordingly, the axial end portion 52 of the seal 48 engages the radially outer surface 58 and the radially extending surface 60 defining the recess 56 in the bearing cup 20.

The bearing cup 20 is connected with the trunnion 26 by stretching the axial end portion 50 of the seal 48 over the trunnion. The bearing cup 20 and bearing 30 are placed on the trunnion 26. The axial end portion 52 of the seal 48 is stretched onto the radially outer surface 58 defining the recess 56 in the bearing cup 20. Accordingly, the axial end portions 50 and 52 of the seal 48 remain in a stretched condition while engaging the outer surface 32 of the trunnion 26 and the outer surface 58 of the bearing cup 20 to retain the lubricant in the space 40 and prevent contaminants from reaching the bearing 30.

From the above description of the invention, those skilled in the art will perceive improvements, changes and modifications. Such improvements, changes and modifications within the skill of the art are intended to be covered by the appended claims.

What is claimed is:

1. A universal joint comprising:
   a cross member having a trunnion with a radially outer surface;
   a cup connectable with said trunnion and a yoke, said cup having an open end with a radially outer surface, said radially outer surface and a radially extending surface of said cup defining a recess;
   a bearing supporting said cup for rotation relative to said trunnion; and
   a seal engaging said trunnion and said cup, said seal having a first axial end portion engaging said radially outer surface of said trunnion and a second axial end portion engaging said radially outer surface of said cup, said first axial end portion being in a stretched condition over said radially outer surface of said trunnion and said second axial end portion being in a stretched condition over said radially outer surface of said cup, said seal extending radially from said radially outer surface of said cup a distance substantially equal to said radially extending surface of said cup, said seal having a substantially constant thickness measured in a radial direction along an entire axial length of said seal in at least two diametrically opposite locations when in the stretched condition.

2. The universal joint as set forth in claim 1 wherein said second axial end portion of said seal engages said radially extending surface of said cup.

3. The universal joint as set forth in claim 2 wherein said seal is elastomeric.

4. The universal joint as set forth in claim 1 wherein said seal is elastomeric.

* * * * *